(12) United States Patent
Chern (10) Patent No.: US 7,145,707 B2
(45) Date of Patent: Dec. 5, 2006

(54) OPTICAL SWITCH

(76) Inventor: Shy-Shiun Chern, 470 S. Sleepy Meadow La., Anaheim, CA (US) 92807

( * ) Notice: Subject to any disclaimer, the term of this patent is extended or adjusted under 35 U.S.C. 154(b) by 14 days.

(21) Appl. No.: 10/520,997

(22) PCT Filed: Aug. 21, 2003

(86) PCT No.: PCT/US03/27369

§ 371 (c)(1),
(2), (4) Date: Jan. 7, 2005

(87) PCT Pub. No.: WO2004/019081

PCT Pub. Date: Mar. 4, 2004

(65) Prior Publication Data

US 2005/0190425 A1  Sep. 1, 2005

Related U.S. Application Data

(60) Provisional application No. 60/405,748, filed on Aug. 22, 2002.

(51) Int. Cl.
*G02B 26/08* (2006.01)

(52) U.S. Cl. .......................................... 359/224; 385/18

(58) Field of Classification Search ........ 359/223–226; 385/16–18
See application file for complete search history.

(56) References Cited

U.S. PATENT DOCUMENTS 6,215,921 B1 * 4/2001 Lin .............................. 385/18

\* cited by examiner

*Primary Examiner*—Euncha P. Cherry (57) ABSTRACT

In an optical switch for routing an optical signal, a deflecting member is mounted movably on a base and is tiltable about a fulcrum shaft so as to deflect the optical signal. Multiple elongate cantilevers are disposed on the base and are arranged around the deflecting member. Each cantilever has a coupling end portion connected to the base and opposite to a hammer end portion disposed on a periphery of the deflecting member. Control units are disposed on the base, and are operably and respectively associated with the cantilevers so as to control movement of the cantilevers to an appropriate one of a suspending position, where the hammer end portion is spaced apart from the deflecting member, and a pumping position, where the hammer end portion strikes the deflecting member, thereby forcing the deflecting member to tilt to a desired direction about the fulcrum shaft.

14 Claims, 10 Drawing Sheets

OPTICAL SWITCH

CROSS-REFERENCE TO RELATED APPLICATION

This application claims priority of U.S. Provisional Patent Application No. 60/405,748, filed on Aug. 22, 2002.

BACKGROUND OF THE INVENTION

1. Field of the Invention

The invention relates to an optical switch, more particularly to an. optical switch for routing an optical signal at high speeds.

2. Description of the Related Art

Due to the requirement of high-speed data transmission in Internet applications, optical switches are often used in image display, data recording, data transmission and data processing. However, a conventional mechanical optical switch is expensive and has a complicated construction and low reliability. Moreover, the switching speed (e.g., 1 millisecond to 100 milliseconds) of a conventional mechanical optical switch cannot meet the demands of high-speed network communication application.

Generally, conventional mechanical switch includes a deflecting device having a movable deflector. First, two assumptions are made to simplify analysis.

1. The moment of linear displacement of the deflector is greater than, about 3.14 timer, the angular moment of the deflector when tilting.
2. The inertial mass of the deflecting device is about 3.1.4 times that of the deflector.

If the deflector is made of silicon with a density of 2.33 g/cm³, and has a volume of 90×90×4 μm³, the force f and the power P required to move the deflector by a distance of 1.2 μm within a period of 40 nanoseconds are as follows:

$$f = 2 \times m \times \frac{s}{t^2}$$
$$= 2 \times 7.55 \times 10^{-8} \times \frac{1.2 \times 10^{-4}}{(4 \times 10^{-8})^2}$$
$$= 1.13 \times 10^4 \text{ dynes } (1/9 \text{ Newton})$$

$$P = f \times \frac{s}{t}$$
$$= 1.13 \times 10^4 \times \frac{1.2 \times 10^{-4}}{4 \times 10^{-8}}$$
$$= 34 \times 10^6 \text{ watts (34 Megawatts)}$$

Both the required force f and power P are not available in conventional integrated circuits. Particularly, since it is difficult to apply a force of 1 Newton to a tiny space smaller than a tip of a hair strand, the switching speed of the conventional mechanical optical switch is thus limited to millisecond-levels.

To solve the above problem, various techniques for mechanical optical switches, such as liquid crystal, piezoelectric, sound wave, temperature and electrostatic, lave been proposed heretofore in response to growing requirements. However, the switching speeds of mechanical optical switches using the above techniques can only be promoted to microsecond levels.

SUMMARY OF THE INVENTION

Therefore, the object of the present invention is to provide an optical switch for routing an optical signal at high speeds.

According to the present invention, there is provided an optical switch for routing an optical signal. The optical switch comprises:

a base having a fulcrum shaft;

a deflecting member mounted movably on the base and tiltable about the fulcrum shaft so as to be adapted for deflecting the optical signal;

a plurality of elongate cantilevers disposed on the base and arranged around the deflecting member, each of the cantilevers having a hammer end portion disposed on a periphery of the deflecting member, and a coupling end portion opposite to the hammer end portion and connected to the base, each of the cantilevers being operable so as to move from a suspending position, where the cantilever is bent such that the hammer end portion is spaced apart from the deflecting member, thereby storing a restoring force in the cantilever, to a pumping position, where the hammer end portion strikes the deflecting member so as to force the deflecting member to tilt about the fulcrum shaft; and a plurality of control units, each of which is disposed on the base, is operably associated with a corresponding one of the cantilevers, and is capable of controlling the corresponding one of the cantilevers to move to an appropriate one of the suspending position and the pumping position so as to enable the deflecting member to tilt to a desired direction.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENT

Before the present invention is described in greater detail, it should be noted that like elements are denoted by the same reference numerals throughout the disclosure.

Figure 1:
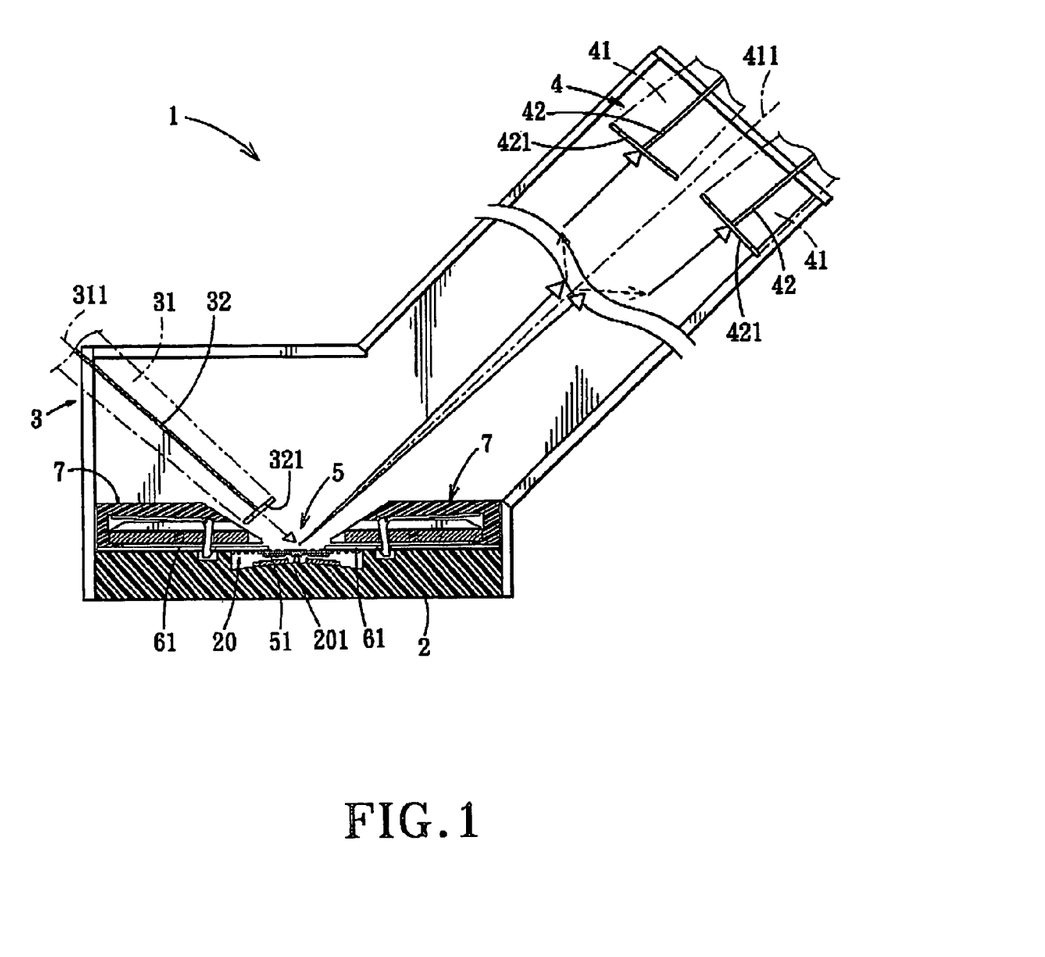
FIG. 1 is a schematic sectional view showing the first preferred embodiment of an optical switch according to the present invention.

Referring to FIG. 1, the first preferred embodiment of an optical switch 1 according to the present invention is shown. In this embodiment, the optical switch 1 is adapted to be installed in an optical router (not shown) and to be connected electrically to a drive chip (not shown) and a digital network processor chip (not shown). The optical switch 1 includes an input module 3, a plurality of output modules 4, a base 2, a deflecting member 5, a plurality of elongate cantilevers 51, and a plurality of control units 7.

The input module 3 is adapted for providing the optical signal to the deflecting member 5. In this embodiment, the input module 3 includes an input port 31 provided with an input optical fiber 32 therein. Although the input optical fiber 32 is used for transmission of the optical signal in this embodiment, an optical waveguide serving as a medium for transmitting optical signals can replace the input optical fiber 32. In this embodiment, the input optical fiber 32 has an exit end 321 having a cross-section with a diameter of 60 μm. A distance between the exit end 321 and the deflecting member 5 is less than 0.2 mm. In this embodiment, the input module 3 is disposed on one side of the deflecting member 5.

The base 2 is provided with a fulcrum shaft 22. In this embodiment, the base 2 is formed with a deflector receiving groove 20 that has a concave bottom wall 201 provided with the fulcrum shaft 22 thereon. The fulcrum shaft 22 has a height within a range from 8 μm to 9.9 μm, and a diameter of 10 μm.

Figure 2:
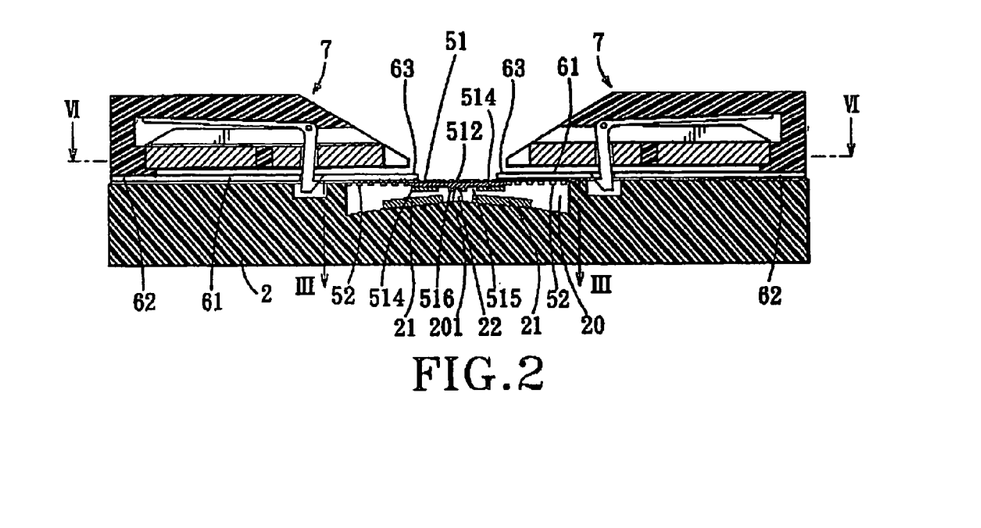
FIG. 2 is a schematic sectional view showing elongate cantilevers of the first preferred embodiment in an initial state.
Figure 3:
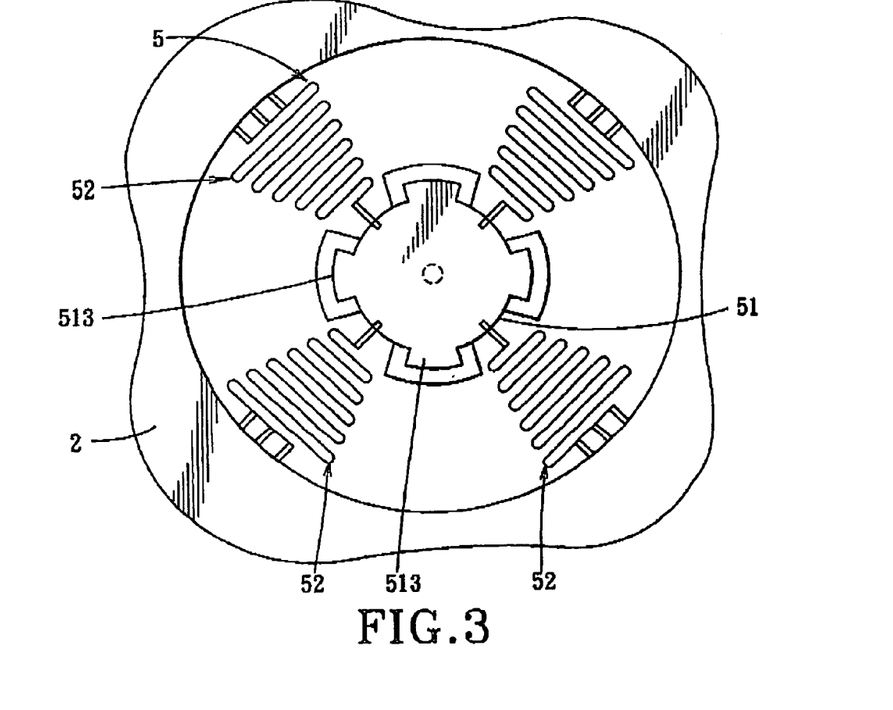
FIG. 3 is a schematic top view showing a deflecting member of the first preferred embodiment, viewed along line III—III of FIG. 2.

Referring to FIGS. 2 and 3, the deflecting member 5 is mounted movably on the base 2 and is tiltable about the fulcrum shaft 22 so as to be adapted for deflecting the optical signal from the input module 3. In this embodiment, the deflecting member 5 includes a deflector 51 disposed on the fulcrum shaft 22, and a set of suspension arms 52 arranged around the deflector 51 and interconnecting the deflector 51 and the base 2, as shown in FIG. 3.

In order to reduce the dispersion in transmission of the optical signal via the input module 3, the input optical fiber 32 is chosen to be a self-focusing fiber with a low index grading rate. A self-focusing fiber is obtained with a "sech ( )" profiled refractive index distribution. The refractive index n(r) of the input optical fiber 32 can be expressed as $$n(r) = n(0) \times \sec h(a \times r) = \frac{2 \times n(0)}{e^{(a \times r)} + e^{(a \times r)}}$$

where "r" is a radial distance between a test point and an axis of the input optical fiber 32, and "a" is an index grading constant. In this condition, the optical signal will be focused at a length of $$F = \frac{n}{(2 \times a)} = 7.854 \text{ mm when } a = 2 \text{ per cm,}$$

regardless of the wavelength or incident angle of the optical signal as long as the optical signal is focused within a deflecting area of the deflecting member 5. Consequently, when the length of the input optical fiber 32 is equal to an integral multiple of a half period, angular divergence at the exit end 321 is $$2n(0) \times \tan^{-1}\left(\frac{d}{f}\right) = 0.0238 \text{ Rad.} = 1.36 \text{ degree.}$$

In other words, if the distance between the deflector 51 and the exit end 321 is 6 mm, the diameter of the deflector 51 should be at least 86 μm. if the distance between the deflector 51 and each output module 4 is 8 mm, the diameter of an output optical fiber 42 of each output module 4 should be at least 200 μm.

In this embodiment, the deflector 51 has a low inertia mass, and is formed as a disk with a thickness of 4 μm and a diameter of 90 μm, which meets the above condition due to the distance between the deflector 51 and the exit end 321 being less than 6 mm. The deflector 51 has a top surface 512 coated with a highly reflective gold film, and a bottom surface 515 formed with an O-ring shaped bump 516 at the center to fit on a tip of the fulcrum shaft 22 and a plurality of magnetic pads 514 (four in this embodiment) with an area of 300 μm$^2$ corresponding to a plurality of permanent magnets 21, each of which is mounted on the bottom wall 201 of the deflector receiving groove 20 in the base 2 and has a magnetic flux of 0.25 tesla, a thickness of 2 μm and an area of 600 μm$^2$. The deflector 51 further has a plurality of extensions 513 extending radially from a periphery of the deflector 51, as shown in FIG. 3. In this embodiment, each suspension arm 52 has a serpentine configuration with a cumulative length not less than 600 μm, and a width that increases in a direction from the deflector 51 to the base 2. A maximum displacement of each suspension arm 52 at an end point is 0.84 μm such that the strain of each suspension arm 52 is less than 0.14%. Each suspension arm 52 has a cross-section with a size of 2×2, μm$^2$ fabricated through a micro-electromechanical process. In order to reduce unwanted oscillations of the suspension arms 52, each suspension arm 52 can be surrounded with a cushioning member (not shown) for damping purposes.

In this embodiment, four output modules 4 (only two are shown in FIG. 1) are disposed on another side of the deflecting member 5 opposite to said one side. Tilting of the deflecting member 5 to a desired direction results in receipt of the optical signal deflected by the deflecting member 5 by a selected one of the output modules 4. Each output module 4 includes an output port 41 provided with the output optical fiber 42 therein. The output optical fiber 42 can be similarly replaced using an optical waveguide. The output optical fiber 42 of each output module 4 has an entrance end 421 having a cross-section. with a diameter of 200 μm, and has a cross-section with a diameter that is gradually reduced from 200 μm to 60 μm. A distance between the deflecting member 5 and the entrance end 421 of each output module 4 is equal to 6.8 mm (less than 8 mm) that meets the above condition.

Preferably, the input module 3 has an axis 311 that forms an angle ranging from 0° to 180° with an imaginary axis 411 parallel to the output optical fibers 42 of the output modules 4. In this embodiment, the angle is 90°. The axes 311, 411 intersect at a center of the top surface 512 of the deflector 51. The output optical fibers 42 are evenly distributed around and respectively form a 3.55° angle with the axis 411. The 3.55° angle is coordinated with two times of the achievable tilting angle of the deflector 51.

Figure 4:
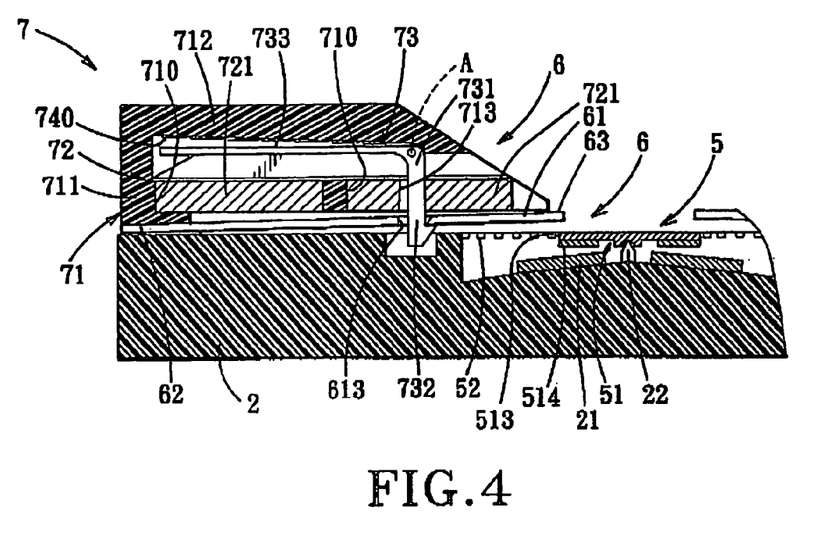
FIG. 4 is a fragmentary schematic sectional view showing one cantilever of the first preferred embodiment at a suspending position.
Figure 5:
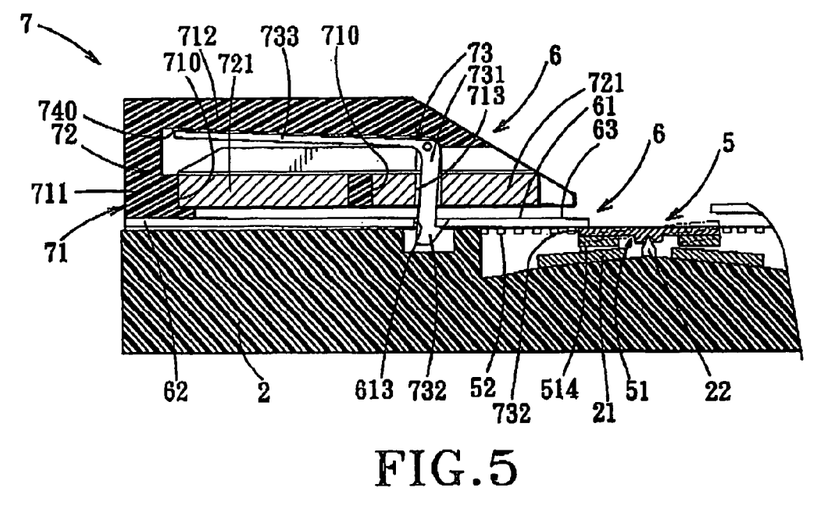
FIG. 5 is a fragmentary schematic sectional view showing cane cantilever of the first preferred embodiment when moved from the suspending position to a pumping position.

With further reference to FIGS. 2, 4 and 5, the cantilevers 61 are disposed on the base 2 and are arranged around the deflecting member 5. Each cantilever 61 has a hammer end portion 63 disposed on a periphery of the deflecting member 5, and a coupling end portion 62 opposite to the hammer end portion 63 and connected to the base 2. Each cantilever 61 is operable so as to move from a suspending position, where the cantilever 61 is bent such that the hammer end portion 63 is spaced apart from the deflecting member 5, as shown in FIG. 4, thereby storing a restoring force in the cantilever 61, to a pumping position, where the hammer end portion 63 strikes a corresponding one of the extensions 513 of the deflector 51 so as to force the deflector 51 to tilt about the fulcrum shaft 22, as shown in FIG. 5. In this embodiment, each cantilever 61 has a length of 1.5 mm and a cross-section with a size of 3200 μm$^2$.

Figure 6:
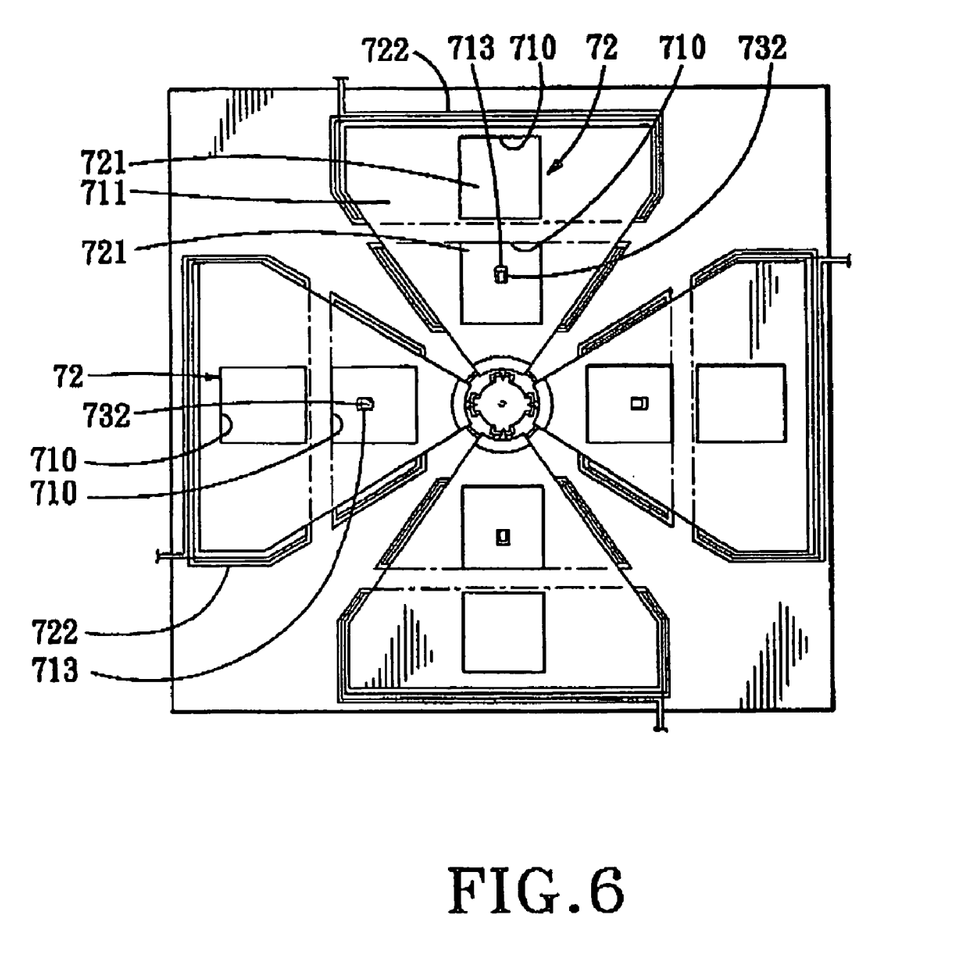
FIG. 6 is a schematic top view showing electromagnets of control units of the first preferred embodiment, viewed along line VI—VI of FIG. 2.

With further reference to FIGS. 4 to 6, each control unit 7 is disposed on the base 2, is operably associated with a corresponding one of the cantilevers 61, and is capable of controlling the corresponding one of the cantilevers 61 to move to an appropriate one of the suspending position and the pumping position so as to enable the deflector 51 of the deflecting member 5 to tilt to a desired direction. In this embodiment, each control unit 7 includes a mounting member 71, an electromagnet 72, an electrostatic plate 740, and an L-shaped actuator 73. The mounting member 71, which is made of a non-magnetic material (such as silicon), is disposed on the base 2 adjacent to the corresponding one of the cantilevers 61, and has a lower mounting plate 711 formed with two mounting holes 710, and an upper mounting plate 712. The thickness of the lower mounting plate 711 is preferably 200 μm. Each of the lower and upper mounting plates 711, 712 has a shape that converges in a 45° angle and in a direction toward the deflector 57. so as not to block light transmission from the input module 3 to the selected output module 4. The electromagnet 72 is mounted on the mounting member 71, and has two magnet cores 721 mounted in the mounting holes 710 in the lower mounting plate 771, and a coil 722 surrounding the lower mounting plate 711, as shown in FIG. 6. The actuator 73 leas an intermediate pivot portion 731 connected pivotally to the mounting member 71 and pivotable about a pivot axis (A) transverse to the fulcrum shaft 22, an elongate hooking portion 732 connected to the intermediate pivot portion 731 and extending through a through hole 713 in the magnet core 721 and a through hole 613 in the corresponding one of the cantilevers 61, and an electrostatically-attractive interacting portion 733 connected to the intermediate pivot portion 731 and transverse to the hooking portion 732. The electrostatic plate 740 is mounted on the upper mounting plate 712 and is disposed above the interacting portion 733 of the actuator 7. In this embodiment, the cantilevers 61 are made of magnetically-attractive. The electromagnet 72 is operable in one of an energized state and a de-energized state. The electromagnet 72 attracts the hammer end portion 63 when in the energized state so as to enable the actuator 73 to pivot about the pivot axis (A) such that the hooking portion 732 moves and holds the lifted hammer end portion 63 of the corresponding one of the cantilevers 61 to dispose the corresponding one of the cantilevers 61 in the suspending position, as shown in FIG. 4. The electromagnet 72 pre-releases the hammer end portion 63 of the corresponding cantilever 61 when in the de-energized state while the electrostatic plate 740 is operable to attract the interacting portion 733 so as to enable the actuator 73 to pivot about the pivot axis (A) such that the hooking portion 732 permits movement of the hammer end portion 63 of the corresponding one of the cantilevers 61 to dispose the corresponding one of the cantilevers 61 in the pumping position by virtue of the restoring force in the corresponding one of the cantilevers 61. It is noted that, if each cantilever 61 is magnetically attractive and has an area large enough to be attracted by the electromagnet 72 so as to dispose the cantilever 61 in the suspending position, the actuator 73 can be omitted.

Figure 7:
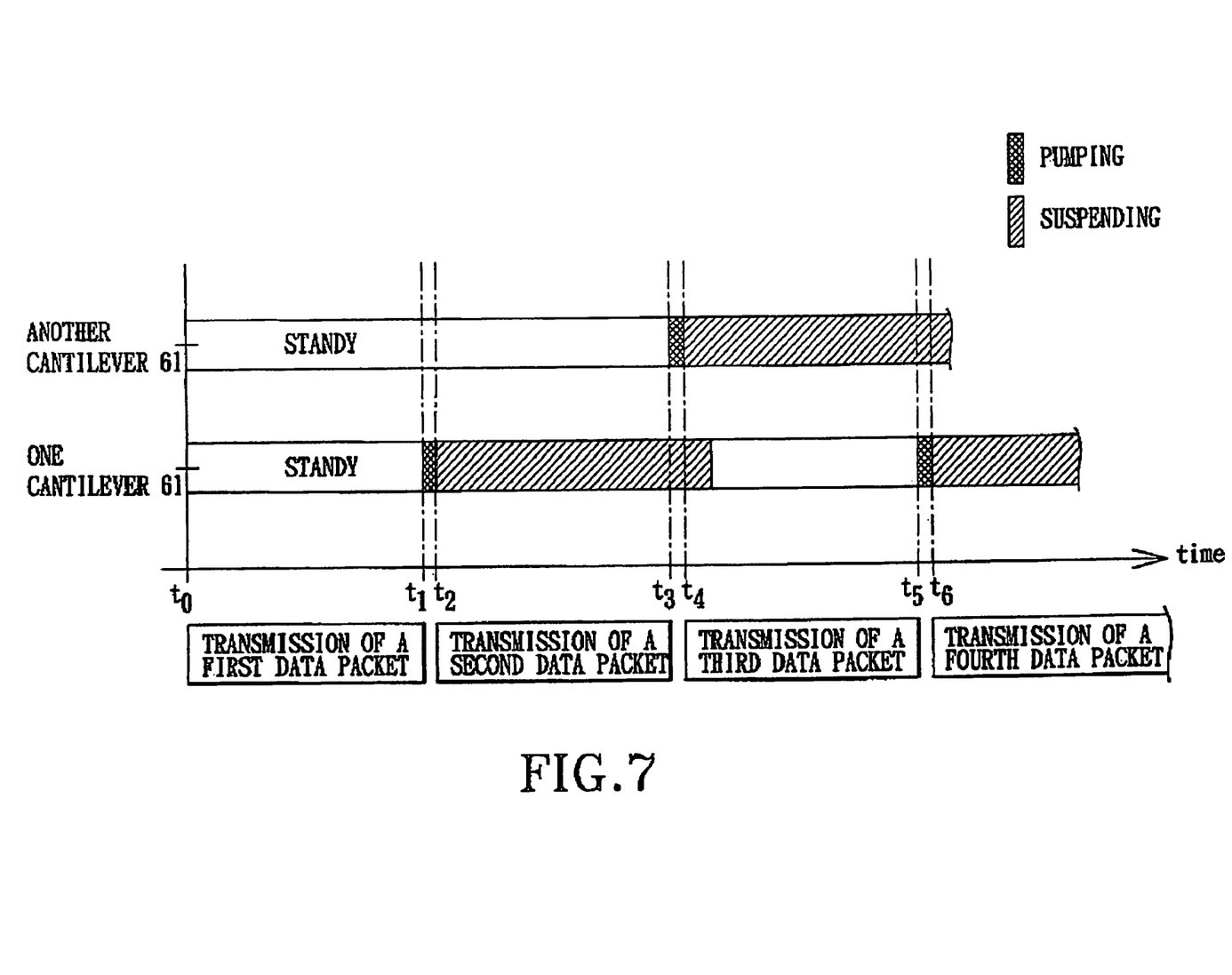
FIG. 7 is a timing diagram illustrating how the first preferred embodiment controls two cantilevers.

The optical switch 1 of the present invention can be applied to a communication system with 300 channels, such as in the DWDM (Dense Wavelength Divided multiplexing) mode operations, for transmission of 128-bit data packets at a speed of 40 Gbps (Giga bits per second). Referring to FIG. 7, the cantilevers 61 are disposed in the suspending position at initial time $t_o$ when the cantilevers 61 are in the energized state. A first data packet can be transmitted within a period from $t_0$ to $t_1$ (about 0.96 μs). The control unit 7 controls the electrostatic plate 740 corresponding to one cantilever 61 to release the interacting portion 733 of the actuator 73 associated with said one cantilever 61 at $t_1$. As such, a second data packet can be transmitted to a desired one of the output modules 42 within a period from $t_2$ to $t_3$ (about 0.96 μs), and the time period from $t_1$ to $t_2$ is about 10 ns. Thereafter, the control unit 7 controls the electrostatic plate 740 corresponding to another cantilever 61 to release the interacting portion 733 of the actuator 73 associated with said another cantilever 61 at $t_3$. As such, a third data packet can be transmitted to a desired one of the output modules 42 within a period from $t_4$ to is (about 0.96 μs), the time period from $t_3$ to $t_4$ being about 10 ons. It is noted that a third data packet should be transmitted to a desired one of the output modules 42 at $t_4$. It takes about 1 μs to move the cantilever 61 from the pumping position to the suspending position. The period from $t_2$ to $T_s$ is 1.93 μs. Therefore, the optical switch 1 of this invention can be switched in sufficient time during data transmission.

Figure 8:
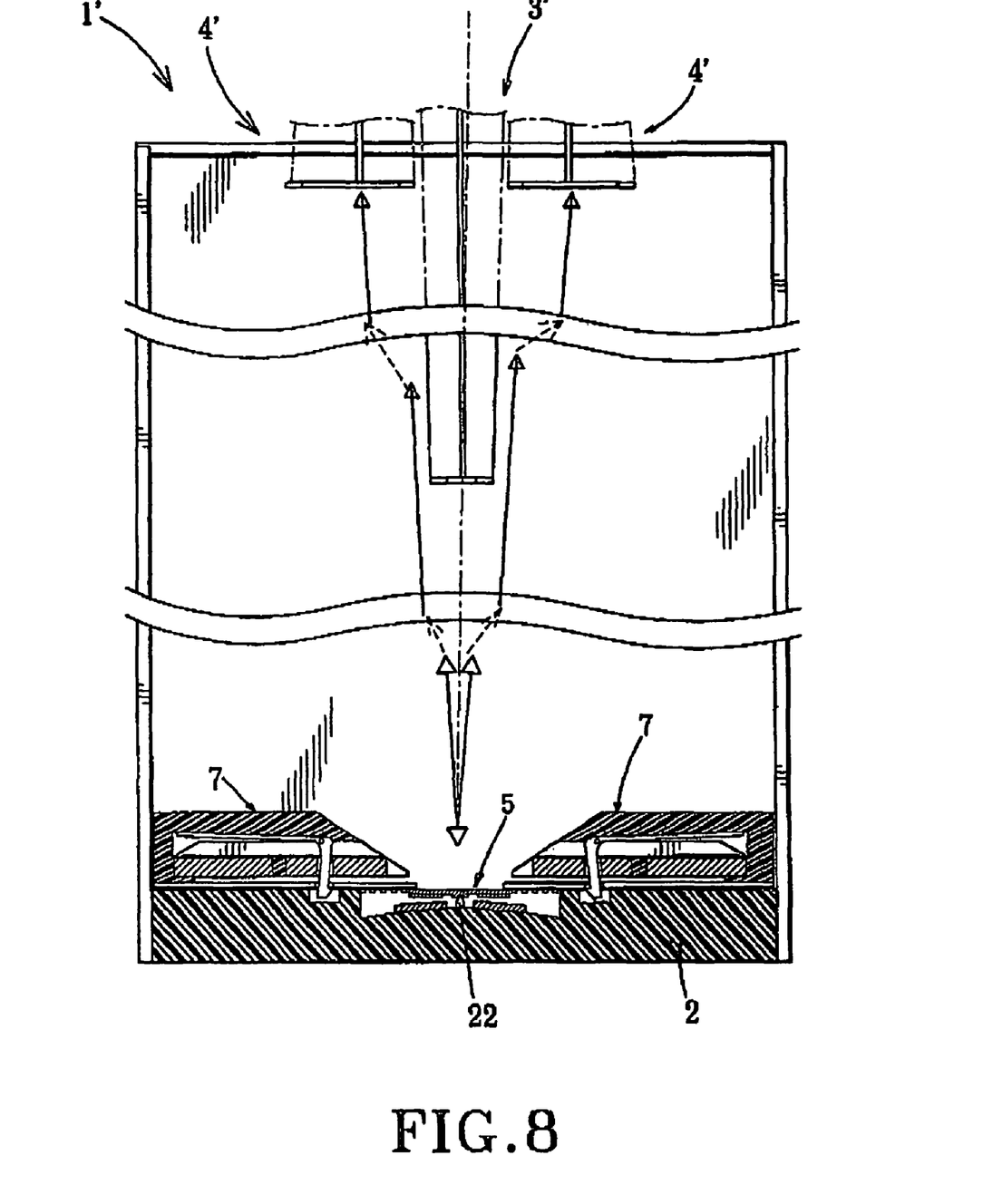
FIG. 8 is a schematic sectional view showing the second preferred embodiment of an optical switch according to the present invention.

FIG. 8 illustrates the second preferred embodiment of an optical switch according to this invention, which is a modification of the first preferred embodiment. Unlike the embodiment of FIG. 1, the input module 3' is substantially aligned with the fulcrum shaft 22. The output modules 4' are disposed around the input module 3'.

Figure 9:
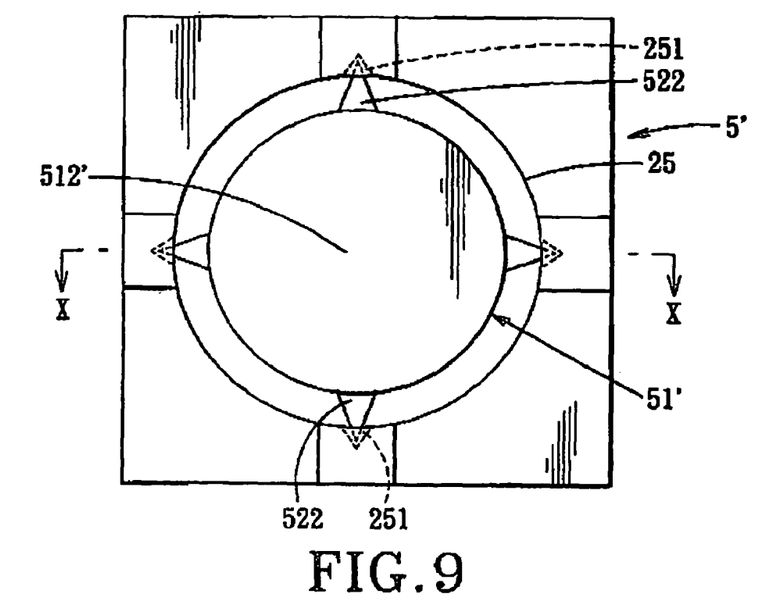
FIG. 9 is a schematic top view showing a deflecting member of a third preferred embodiment of an optical switch according to the present invention.
Figure 10:
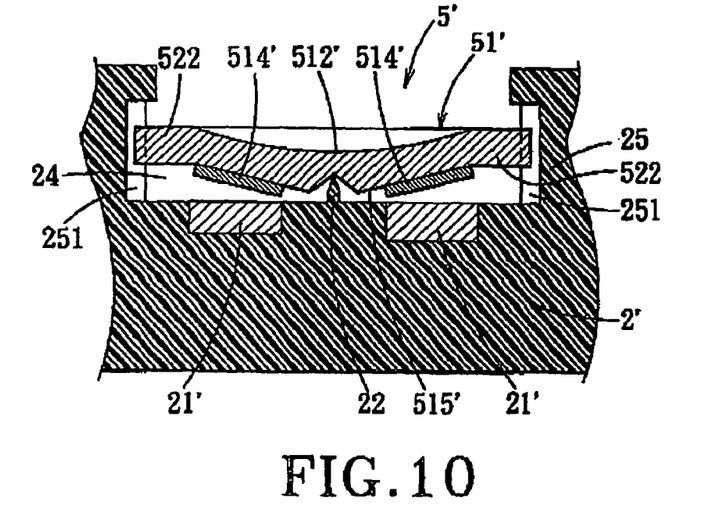
FIG. 10 is a schematic sectional view showing the deflecting member of the third preferred embodiment, taken along line X—X of FIG. 9.
Figure 11:
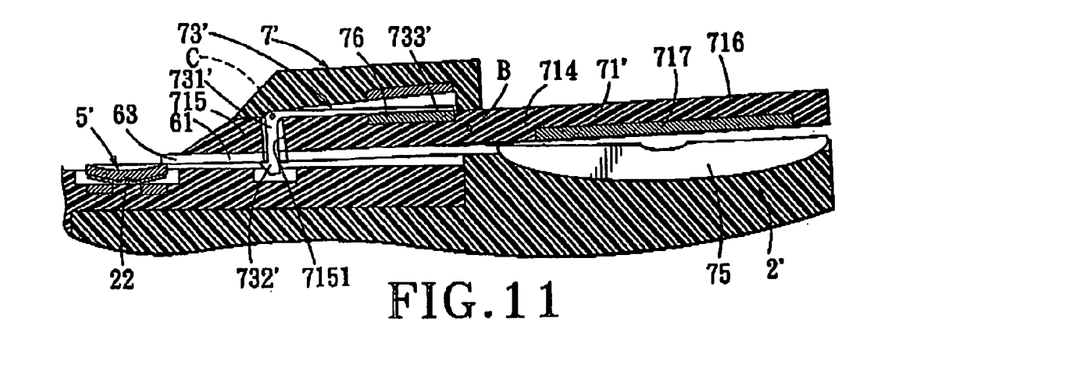
FIG. 11 is a fragmentary schematic sectional view showing an elongate cantilever of the third preferred embodiment in an initial state.

FIG. 9 to 11 illustrate the third preferred embodiment of an optical switch according to this invention, which is a modification of the first preferred embodiment. Unlike the previous embodiment, the deflecting member 5' includes a deflector 51' having a deflecting side 512' and a mounting side 515' opposite to the deflecting side 512'. The deflector 51' is formed with a plurality of projections 522 extending radially from a periphery of the deflector 51', as shown in FIG. 9. The base 2' is formed with a deflector receiving recess 24. The fulcrum shaft 22 is disposed in the deflector receiving recess 24. The deflector receiving recess 24 is confined by a confining wall 25 that extends parallel to the fulcrum shaft 22. The confining wall 25 is formed with a plurality of guiding grooves 251 corresponding to the projections 522 on the deflector 51' such that the projections 522 are positioned movably and respectively well within the guiding grooves 251 when the mounting side 515' of the deflector 51' is disposed on the fulcrum shaft 22 in the deflector receiving recess 24, as shown in FIG. 10. The deflecting member 5' further includes a set of magnetic plates 514' mounted on the mounting side 515' of the deflector 51'. The base 21 is further provided with a set of permanent magnet blocks 21' in the recess 24 and corresponding to the magnetic plates 514' for stabilizing the deflector 51' when one of the cantilevers 61 strikes the deflector 51'.

Referring to FIG. 11, each control unit 7' includes a driving member 71', a first electromagnet member 75, a second electromagnet member 76, and an L-shaped actuator 73'.

The driving member 71' is connected pivotally to the base 21 and is disposed on the base 2' adjacent to the corresponding one of the cantilevers 61. The driving member 71' has a first intermediate pivot portion 714 connected pivotally to the base 2' and pivotable about a first pivot axis (B) transverse to the fulcrum shaft 22, a driving end portion 715 connected to the first intermediate pivot portion 714 and disposed above the corresponding one of the cantilevers 61 and adjacent to the deflecting member 5', and a magnetically-attractive end portion 716 opposite to the driving end portion 715 and connected to the first intermediate pivot portion 714. In this embodiment, the magnetically-attractive end portion 716 is formed with a magnetic plate 717.

The first electromagnet member 75 is mounted on the base 2' and is disposed adjacent to and below the magnetic plate 717 on the end portion 716 of the driving member 71'.

The second electromagnet member 76 is mounted on the driving end portion 715 of the driving member 71'.

The L-shaped actuator 73' has a second intermediate pivot portion 731' connected pivotally to the driving end portion 715 of the driving member 71' and pivotable about a second pivot axis (C) transverse to the fulcrum shaft 22 and parallel to the first pivot axis (B), an elongate hooking portion 732' connected to the second intermediate pivot portion 731', and extending through a through hole 7151 in the driving end portion 715 and a through hole 613 in the corresponding one of the cantilevers 61, and a magnetically-attractive interacting portion 733' connected to the second intermediate pivot portion 731' and disposed adjacent to the second electromagnet member 76.

Figure 12:
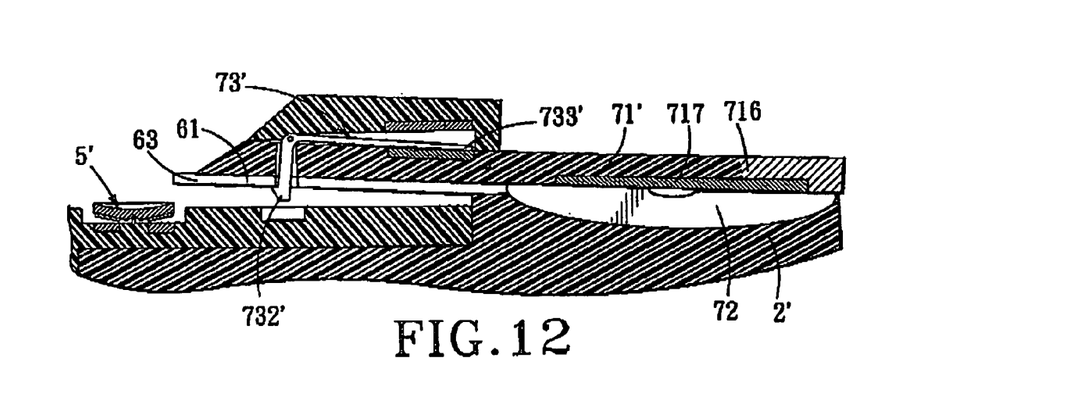
FIG. 12 is a fragmentary schematic sectional view showing one cantilever of the third preferred embodiment at a suspending position.

The first electromagnet member 75 is energized to attract the magnetically-attractive end portion 716 of the driving member 71, so as to enable the driving member 71' to pivot about the first pivot axis (B) such that the hooking portion 732' of the actuator 73' moves with the driving end portion 715 of the driving member 71' so as to hook the hammer end portion 63 of the corresponding one of the cantilevers 61 when the second electromagnet member 76 is energized to attract the interacting portion 733' of the actuator 73' in order to dispose the corresponding one of the cantilevers 61 in the suspending position, as shown in FIG. 12.

Figure 13:
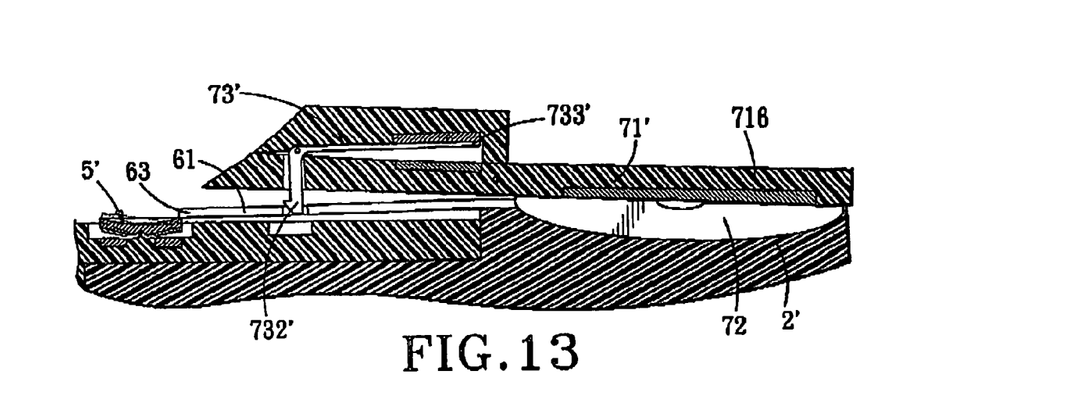
FIG. 13 is a fragmentary schematic sectional view showing one cantilever of the third preferred embodiment when moved from the suspending position to a pumping position.

The second electromagnet member 76 is energized (see FIG. 12), and is de-energized to release the interacting portion 733' of the actuator 73' and enable pivoting movement of the actuator 73' such that the hooking portion 732' of the actuator 73' permits movement of the hammer end portion 63 of the corresponding one of the cantilevers 61 to dispose the corresponding one of the cantilevers 61 in the pumping position by virtue of the restoring force of the corresponding one of the cantilevers 61, as shown in FIG. 13.

FIG. 14 to 17 illustrate the fourth preferred embodiment of an optical switch according to this invention, which is a modification of the first preferred embodiment. Unlike the previous embodiments, each control unit 8 includes a mounting member 81, a first electromagnet member 82, a magnetically-attractive working plate 83, a second electromagnet member 84, and a sliding actuator 85.

Figure 14:
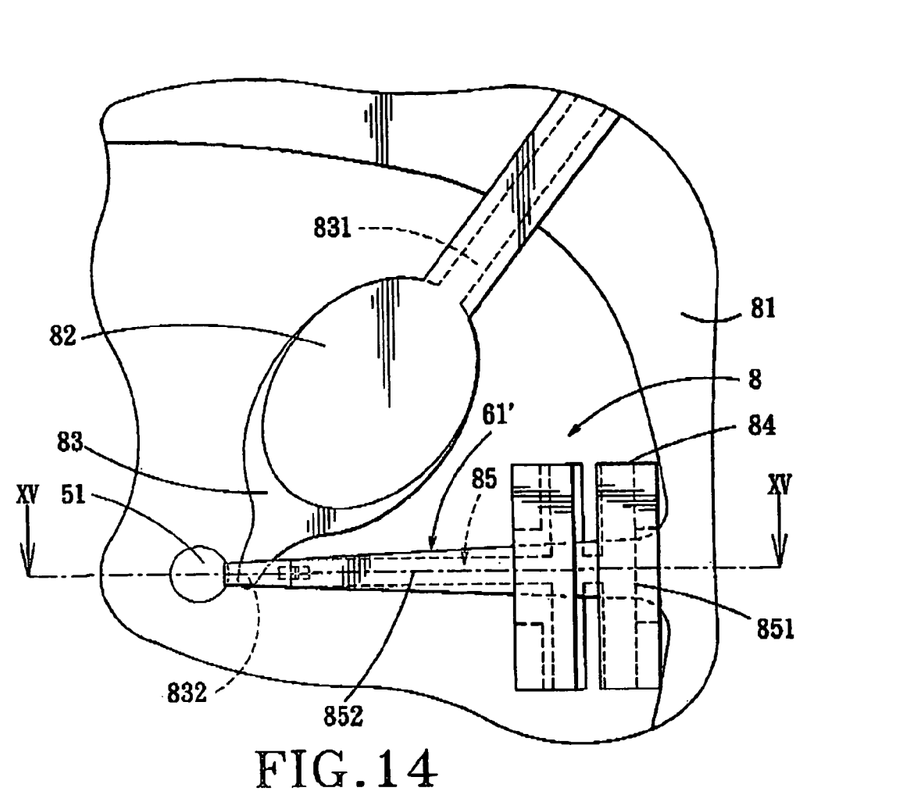
FIG. 14 is a fragmentary schematic top view showing the fourth preferred embodiment of an optical switch according to the present invention when a sliding actuator is disposed at a holding position.

The mounting member 81 is disposed on the base 2' adjacent to the corresponding one of the cantilevers 61'.

The first electromagnet member 82 is mounted on the mounting member 81.

The working plate 83 is disposed below the first electromagnet member 82, and has a connecting end 831 connected to the mounting member 81, and a driving end 832 opposite to the connecting end 831, and disposed below the hammer end portion 63' of the corresponding one of the cantilevers 61'.

The second electromagnet member 84 is mounted on the mounting member 81, and is disposed adjacent to the coupling end portion 62' of the corresponding one of the cantilevers 61'.

Figure 15:
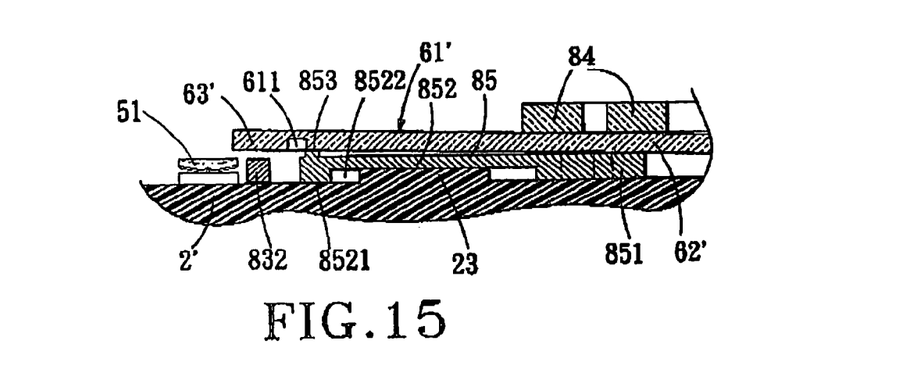
FIG. 15 is a fragmentary schematic sectional view showing one cantilever of the fourth preferred embodiment at a suspending position, taken along line XV—XV of FIG. 14.
Figure 16:
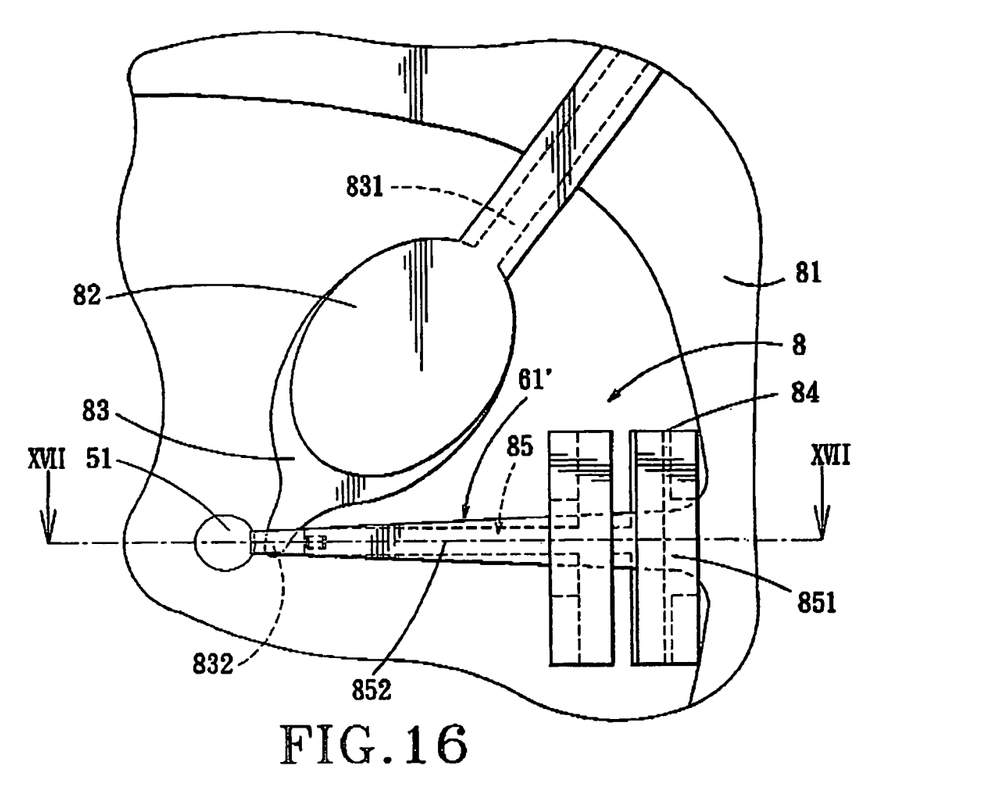
FIG. 16 is a fragmentary schematic view showing the sliding actuator of the fourth preferred embodiment at a releasing position.

The actuator 85 is disposed slidably between the base 2' and the corresponding one of the cantilevers 61', and has a magnetically-attractive interacting portion 851 disposed adjacent to the second electromagnet member 84, and an elongate actuating portion 852 connected to the interacting portion 851 and disposed directly underneath the corresponding one of the cantilevers 61'. The actuating portion 852 is formed with an upwardly extending actuating projection 853. The corresponding one of the cantilevers 61' is formed with a receiving groove 611 corresponding to the actuating projection 853. In this embodiment, the actuating portion 852 has a bottom surface 8521 formed with an elongate guiding groove 8522. The base 2' has a top surface formed with an elongate guiding rib 23 that engages slidably the guiding groove 8522, as shown in FIGS. 15 and 17.

The first electromagnet member 82 is operable in one of an energized state and a de-energized state. The first electromagnet member 82 attracts the working plate 83 when in the energized state to move upwardly the hammer end portion 63' of the corresponding one of the cantilevers 61' so as to dispose the corresponding one of the cantilevers 61' in the suspending position.

Figure 17:
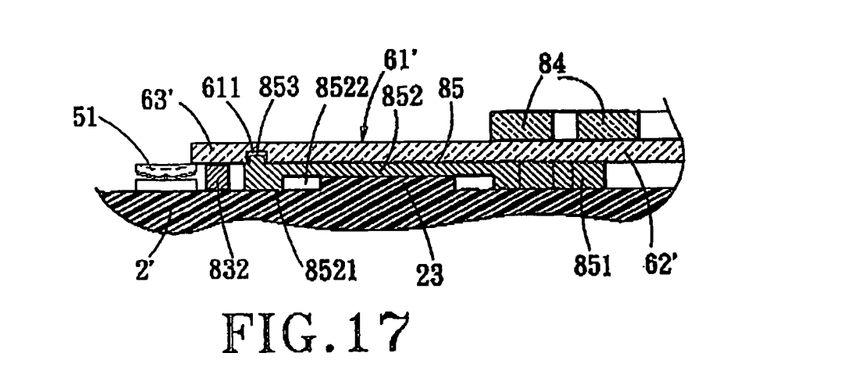
FIG. 17 is a fragmentary schematic sectional view showing one cantilever of the fourth preferred embodiment at a pumping position, taken along line XVII—XVII of FIG. 16.

The second electromagnet member 84 is operable so as to drive the actuator 85 to move from a holding position, where the actuating projection 853 holds the corresponding one of the cantilevers 61' in the suspending position when the first electromagnet 82 is operated from the energized state to the de-energized state, as shown in FIG. 24, to a releasing position, where the actuating projection 853 extends into the receiving groove 611 in the corresponding one of the cantilevers 61' so as to permit movement of the hammer end portion 53' of the corresponding one of the cantilevers 61' to dispose the corresponding one of the cantilevers 61' in the pumping position by virtue of the restoring force in the corresponding one of the cantilevers 61', as shown in FIG. 17.

In the above embodiments, the optical switch of this invention can also be fabricated via a bulk micro machining process, a surface micro machining process, a precision micro machining process, an electro-discharge micro machining process, a laser micro machining process, etc. Furthermore, since the cantilevers 61 are arranged around the periphery of the deflector 51, the optical switch of this invention provides a relatively large space for various arrangements of the cantilevers 61 using conventional low-cost technology.

To sum up, the optical switch of this invention utilizes the period for transmitting the optical signal to the input module to dispose the cantilever 61 in the suspending position. Then, the cantilever 61 can be controlled so as to be moved from the suspending position to the pumping position within a period of nanosecond-level such that the optical switch can be switched at a relatively high speed.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An optical switch for routing an optical signal, comprising:
    a base having a fulcrum shaft;
    a deflecting member mounted movably on said base and tiltable about said fulcrum shaft so as to be adapted for deflecting the optical signal;
    a plurality of elongate cantilevers disposed on said base and arranged around said deflecting member, each of said cantilevers having a hammer end portion disposed on a periphery of said deflecting member, and a coupling end portion opposite to said hammer end portion and connected to said base, each of said cantilevers being operable so as to move from a suspending position, where said cantilever is bent such that said hammer end portion is spaced apart from said deflecting member, thereby storing a restoring force in said cantilever, to a pumping position, where said hammer end portion strikes said deflecting member so as to force said deflecting member to tilt about said fulcrum shaft; and
    a plurality of control units, each of which is disposed on said base, is operably associated with a corresponding one of said cantilevers, and is capable of controlling the corresponding one of said cantilevers to move to an appropriate one of the suspending position and the pumping position so as to enable said deflecting member to tilt to a predetermined direction.

2. The optical switch as claimed in claim 1, further comprising at least one input module adapted for providing the optical signal to said deflecting member, and a plurality of output modules, wherein tilting of said deflecting member to the predetermined direction results in receipt of the optical signal deflected by said deflecting member by a selected one of said output modules.

3. The optical switch as claimed in claim 2, wherein said input module is disposed on one side of said deflecting member, and said output modules are disposed on another side of said deflecting member opposite to said one side.

4. The optical switch as claimed in claim 2, wherein said input module is substantially aligned with said fulcrum shaft, said output modules being disposed around said input module.

5. The optical switch as claimed in claim 1, wherein said deflecting member includes a deflector disposed on said fulcrum shaft, and a set of suspension arms arranged around said deflector and interconnecting said deflector and said base.

6. The optical switch as claimed in claim 5, wherein each of said suspension, arms has a serpentine configuration.

7. The optical switch as claimed in claim 6, wherein each of said suspension arms has a width that increases in a direction from said deflector to said base.

8. The optical switch as claimed in claim 1, wherein said deflecting member includes a deflector having a deflecting side and a mounting side opposite to said deflecting side, said deflector being formed with a plurality of projections extending radially from a periphery of said deflector, said base being formed with a deflector receiving recess, said fulcrum shaft being disposed in said deflector receiving recess, said deflector receiving recess being confined by a confining wall that extends parallel to said fulcrum shaft, said confining wall being formed with a plurality of guiding grooves corresponding to said projections on said deflector such that said projections are positioned movably and respectively in said guiding grooves when said mounting side of said deflector is disposed on said fulcrum shaft in said deflector receiving recess, said deflecting member further including a set of magnetic plates mounted on said mounting side of said deflector, said base being further provided with a set of permanent magnet blocks in said recess and corresponding to said magnetic plates for stabilizing said deflector where one of said cantilevers strikes said deflector.

9. The optical switch as claimed in claim 1, wherein each of cantilevers is made of a magnetically-attractive material.

10. The optical switch as claimed in claim 9, wherein each of said control units includes
    a mounting member disposed on said base adjacent to the corresponding one of said cantilevers,
    an electromagnet mounted on said mounting member, and
    an L-shaped actuator having an intermediate pivot portion, connected pivotally to said mounting member and pivotable about a pivot axis transverse to said fulcrum shaft, an elongate hooking portion connected to said intermediate pivot portion and extending toward the corresponding one of said cantilevers, and a magnetically-attractive interacting portion connected to said intermediate pivot portion and transverse to said hooking portion,
    said electromagnet being operable in one of an energized state and a de-energized state, said electromagnet attracting said hammer end portion of the corresponding one of said corresponding cantilevers when in the energized state so as to enable said actuator to pivot about said pivot axis such that said hooking portion moves said hammer end portion of the corresponding one of said cantilevers to dispose the corresponding one of said cantilevers in the suspending position, said electromagnet releasing said interacting portion when in the de-energized state so as to enable said actuator to pivot about said pivot axis such that said hooking portion permits movement of said hammer end portion of the corresponding one of said cantilevers to dispose the corresponding one of said cantilevers in the pumping position by virtue of the restoring force in the corresponding one of said cantilevers.

11. The optical, switch as claimed in claim 10, wherein each of said control units further includes an electrostatic plate mounted on said mounting member and disposed above said interacting portion of said actuator, said electrostatic plate being operable so as to attract said interacting portion of said actuator when said electromagnet is in the de-energized state to enable said actuator to pivot about said pivot axis.

12. The optical switch as claimed in claim 1, wherein each of said control units includes a driving member connected pivotally to said base and disposed on said base adjacent to the corresponding one of said cantilevers, said driving member having a first intermediate pivot portion connected pivotally to said base and pivotable about a first pivot axis transverse to said fulcrum shaft, a driving end portion connected to said first intermediate pivot portion and disposed above the corresponding one of said cantilevers and adjacent to said deflecting member, and a magnetically-attractive end portion opposite to said driving end portion and connected to said first intermediate pivot portion, a first electromagnet member mounted on said base and disposed adjacent to and below said magnetically-attractive end portion of said driving member, a second electromagnet member mounted on said driving end portion of said driving member, and an L-shaped actuator having a second intermediate pivot portion connected pivotally to said driving end portion of said driving member and pivotable about a second pivot axis transverse to said fulcrum shaft and parallel to the first pivot axis, an elongate hooking portion connected to said second intermediate pivot portion, and extending toward the corresponding one of said cantilevers, and a magnetically-attractive interacting portion connected to said second intermediate pivot portion and disposed adjacent to said second electromagnet member, said first electromagnet member being energized to attract said magnetically-attractive end portion of said driving member so as to enable said driving member to pivot about said first pivot axis such that said hooking portion of said actuator moves with said driving end portion of said driving member so as to hook said hammer end portion of the corresponding one of said cantilevers when said second electromagnet member is energized to attract said interacting portion of said actuator in order to dispose the corresponding one of said cantilevers in the suspending position, said second electromagnet member being de-energized to release said interacting portion of said actuator and enable pivoting movement of said actuator such that said hooking portion of said actuator permits movement of said hammer end portion of the corresponding one of said cantilevers to dispose the corresponding one of said cantilevers in the pumping position by virtue of the restoring force of the corresponding one of said cantilevers.

13. The optical switch as claimed in claim 1, wherein each of said control units includes a mounting member disposed on said base adjacent to the corresponding one of said cantilevers, a first electromagnet member mounted on said mounting member, a magnetically-attractive working plate disposed below said first electromagnet member, said working plate having a connecting end connected to said mounting member, and a driving end opposite to said connecting end and disposed below said hammer end portion of the corresponding one of said cantilevers, a second electromagnet member mounted on said mounting member and disposed adjacent to said coupling end portion of the corresponding one of said cantilevers, and a sliding actuator disposed slidably between said base and the corresponding one of said cantilevers, said sliding actuator having a magnetically-attractive interacting portion disposed adjacent to said second electromagnet member, and an elongate actuating portion connected to said interacting portion and disposed directly underneath the corresponding one of said cantilevers, said actuating portion being formed with an upwardly extending actuating projection, the corresponding one of said cantilevers being formed with a receiving groove corresponding to said actuating projection, said first electromagnet member being operable in one of an energized state and a de-energized state, said first electromagnet member attracting said working plate when in the energized state to move upwardly said hammer end portion of the corresponding one of said cantilevers so as to dispose the corresponding one of said cantilevers in the suspending position, said second electromagnet member being operable so as to drive said actuator to move from a holding position, where said actuating projection holds the corresponding one of said cantilevers in the suspending position when said first electromagnet member is operated from the energized state to the de-energized state, to a releasing position, where said actuating projection extends into said receiving groove in the corresponding one of said cantilevers so as to permit movement of said hammer end portion of the corresponding one of said cantilevers to dispose the corresponding one of said cantilevers in the pumping position by virtue of the restoring force in the corresponding one of said cantilevers.

14. The optical switch as claimed in claim 13, wherein said actuating portion of said actuator has a bottom surface formed with an elongate guiding groove, said base having a top surface formed with an elongate guiding rib that engages slidably said guiding groove.

* * * * *